Dec. 13, 1960     L. T. PERRIAM ET AL     2,964,699
PROBE DEVICE FOR FLAW DETECTION
Filed Sept. 5, 1958
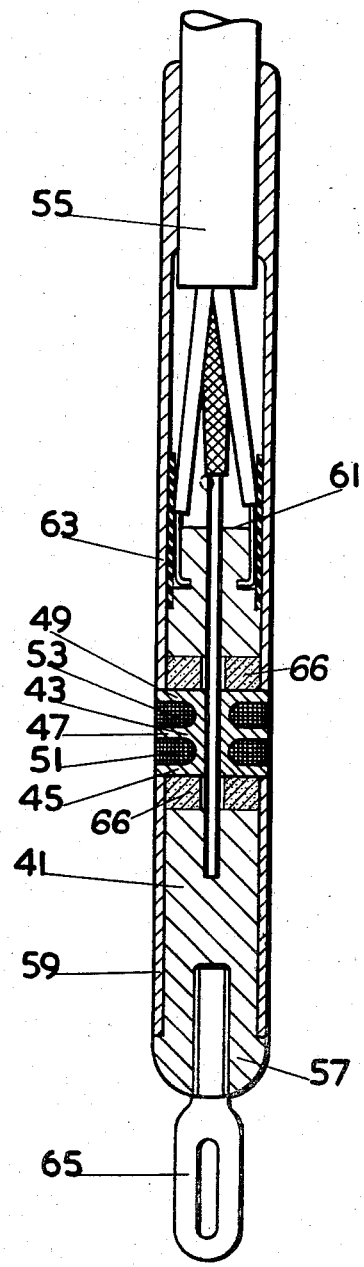
INVENTORS
Leonard Thomas Perriam,
Samual Sidney Goldberg,
BY *Cushman, Darby & Cushman*
ATTORNEYS United States Patent Office 2,964,699
Patented Dec. 13, 1960

2,964,699
PROBE DEVICE FOR FLAW DETECTION

Leonard Thomas Perriam and Samuel Sidney Goldberg, Birmingham, England, assignors to Imperial Chemical Industries Limited, London, England, a corporation of Great Britain Filed Sept. 5, 1958, Ser. No. 759,181

Claims priority, application Great Britain Sept. 9, 1957

5 Claims. (Cl. 324—37)

This invention is concerned with the non-destructive detection of flaws in metals and is particularly concerned with a probe device for detecting flaws in and testing generally, tubular metal elements such as boiler or condenser tubes, without damaging the tubes.

It is desirable periodically to test, in a non-destructive manner, boiler or condenser tubes, in order to determine whether flaws, such as those caused by internal corrosion, have developed during the use of the tubes, since these flaws weaken the tubes. The tubes usually are stacked together in bundles and their inspection is not, therefore, easily accomplished.

Magnetic and electrical methods have been employed for the purpose of non-destructively testing condenser tubes. In such methods it has been customary to employ a flaw-detecting probe device which is designed so that it can be drawn through a condenser tube and which comprises a core of magnetic material provided with three axially-spaced radially-extending flanges of magnetic material. Two insulated coil elements are co-axially wound around the core, so that each coil is disposed between a pair of flanges. The coils are serially connected and are adapted for connection in two of the arms of an electrical measuring-bridge circuit.

When the coils of such a flaw-detecting probe device are connected to a source of alternating current, the flanges act as pole-pieces and a magnetic field is set up by each coil, such field extending externally of a coil between the pole-pieces. It will be appreciated that the intermediate flange acts not only as a pole-piece for one of the coils but also as a pole-piece for the other of the coils.

When the flaw-detecting device is placed within a tube, each field will generate eddy currents in the tube and these eddy currents will react on the coil producing the field so as to modify its resistive and inductive components.

The eddy currents generated in a tube are determined by the conductance of the material, the volume of the material of the tube which is scanned by a coil at any position of the coil, and by the air gap between the pole-pieces and the internal wall of the tube, which has a loading effect on the coil.

If the coils form part of a bridge circuit which is balanced when the flaw-detecting probe device is within a part of a tube without any flaws, and the probe device is moved along the tube, the bridge will become unbalanced when a coil passes a flaw in the tube since the eddy currents produced by that coil will be changed by the flaw.

An indication of the existence of such a flaw can be given by a pen recording device suitably connected to the bridge circuit, any flaw in the tube resulting in a kick to one side or other of the normal trace of the pen.

It has been found in practice that such a flaw-detecting probe device can give efficient results when moved along a tube at a relatively low speed, e.g. about 20 feet per minute, but when drawn through at a high speed, e.g. above 100 feet per minute, the eddy current produced in a given part of the tube by the leading coil have not completely decayed when eddy currents are produced in the same part of the tube by the second coil. This gives rise to spurious results, and can be regarded as a "speed effect," since the bridge becomes unbalanced, although there is no flaw in the tube.

Under some conditions it is essential to inspect condenser tubes at a relatively high speed, for example in the cast of a power station where the plant must be idle for as short a time as possible, and it is an object of this invention to provide a flaw-detecting probe device which can readily be operated at a relatively high speed.

According to this invention, a flaw-detecting probe device comprises a housing of non-magnetic material, at least one inductance coil in the housing which is adapted to form part of an electrical measuring bridge circuit, and a pole-piece of magnetic material at each end of the coil so that a magnetic field can be produced outside the housing and between the pole-pieces when the coil is energised, the surfaces of the housing between the ends of the housing and the outermost pole-pieces comprising non-magnetic metallic material of good electrical conductivity, e.g. copper.

A flaw-detecting probe device in accordance with the invention comprises a housing of non-magnetic material which, in use, is moved inside an article, e.g., a tube to be examined, three pole-pieces of high permeability magnetic material in the housing, an inductance coil between each pair of pole-pieces, the two coils being adapted to form part of an electrical measuring bridge circuit, a copper sleeve on the surface of the housing between one end portion of the housing and one of the outermost pole-pieces and a copper sleeve on the surface of the housing between the other end portion of the housing and the other of the outermost pole-pieces, and having a permanent ferrite magnet adjacent each outermost pole-piece.

A probe device in accordance with the invention has the following advantages:

(1) The field from each coil external to the housing is concentrated over a short distance and spread of the field beyond the coils is considerably lessened by the use of the copper sleeves; and (2) The probe device can be employed for the tests of magnetic material since the magnetic effect thereof is eliminated by the use of ferrite magnets.

In the single figure of the accompanying drawing, there is shown a sectional view of a probe device in accordance with the instant invention.

Referring to the drawing, the probe device comprises a housing 41 having a bobbin 43 of high permeability magnetic material with pole-pieces 45, 47 and 49. An inductance coil 51 is wound on the bobbin between pole-pieces 45 and 47 and a second inductance coil 53, similar to the first, is wound on the bobbin between pole-pieces 47 and 49. The two coils may be connected to an electrical measuring bridge circuit which is normally balanced by means of a cable 55. As the device is passed through a tube to be examined, any flaw results in the bridge becoming unbalanced, as with probe devices previously employed. The external surface of the housing between one of the outermost pole-pieces 45 and the end portion 57 of the housing is covered by a sleeve of copper 59 and the external surface of the housing between the other of the outermost pole-pieces 49 and the end 61 of the housing is covered by a copper sleeve 63. The copper sleeve is extended beyond the end 61 of the housing to provide a tail piece. Adjacent each outermost pole-piece and shrouded by copper sleeves 61 and 63, two permanent ferrite magnets 66 are provided. The provision of such permanent magnets enables the probe device to be used for testing magnetic materials because the magnetic effect thereof is eliminated by the permanent magnets. An eye bolt 65 is provided on the end portion 57 to enable the device to be drawn, by means of a cord, through a tube to be tested.

It will be observed that in the device described above, the magnetic gaps are small and the two coils are close together. The probe device, when in use, is thus able to detect very small flaws, whilst the magnetic field is able to penetrate the tube wall and is able to discriminate between flaws which are very close together.

Probe devices in accordance with the invention are particularly suitable with an associated electrical circuit which employs some form of phase rectification. When the probe devices are pulled through a tube under examination, any changes in acceleration generate spurious voltages which may well give rise to a misleading indication of the flaws in the tube. The spurious voltages due to this "speed effect" have a constant phase difference and an amplitude proportional to the acceleration; by employing an electrical circuit employing phase rectification, the effect of the spurious voltages is so reduced that there is no interference with the detection of flaws in a tube.

In the illustrative embodiment of the invention copper discs placed against the outermost pole-pieces can be used for additional absorption of extraneous eddy currents.

Magnets of ferrite material are employed, rather than magnets of metallic materials, since they do not give rise to eddy current absorption which would reduce the sensitivity of the device.

We claim:

1. A flaw-detecting probe device comprising a housing of non-magnetic material, at least one inductance coil in the housing which is adapted to form part of an electrical measuring bridge circuit, and a pole-piece of magnetic material at each end of the inductance coil so that a magnetic field can be produced outside the housing and between the pole-pieces when the coil is energised, the surface of the housing between an end of the housing and an outermost pole-piece nearest to that end comprising non-magnetic metallic material of good electrical conductivity whereby the magnetic field produced by the inductance coil is concentrated between the pole-pieces.

2. A flaw-detecting probe device as claimed in claim 1 in which the non-magnetic material is copper.

3. A flaw-detecting probe device as claimed in claim 1 having a permanent ferrite magnet adjacent each outermost pole-piece.

4. A flaw-detecting probe device comprising a housing of non-magnetic material which, in use, is moved inside an article, e.g., a tube, to be examined, three pole-pieces of high permeability magnetic material in the housing, an inductance coil between each pair of pole-pieces, the two coils being adapted to form part of an electrical measuring bridge circuit, a copper sleeve on the surface of the housing between one end portion of the housing and one of the outermost pole-pieces and a copper sleeve on the surface of the housing between the other end portion of the housing and the other of the outermost pole-pieces.

5. A flaw-detecting probe device as claimed in claim 4 having a permanent ferrite magnet adjacent each outermost pole-piece.

References Cited in the file of this patent

UNITED STATES PATENTS

| 2,104,646 | Greenslade | Jan. 4, 1938 |
| 2,415,789 | Farrow | Feb. 11, 1947 |
| 2,467,306 | Habig | Apr. 12, 1949 |